July 21, 1936.　　　　H. L. BERRY　　　　2,048,591
METAL DETECTING DEVICE
Filed July 23, 1934
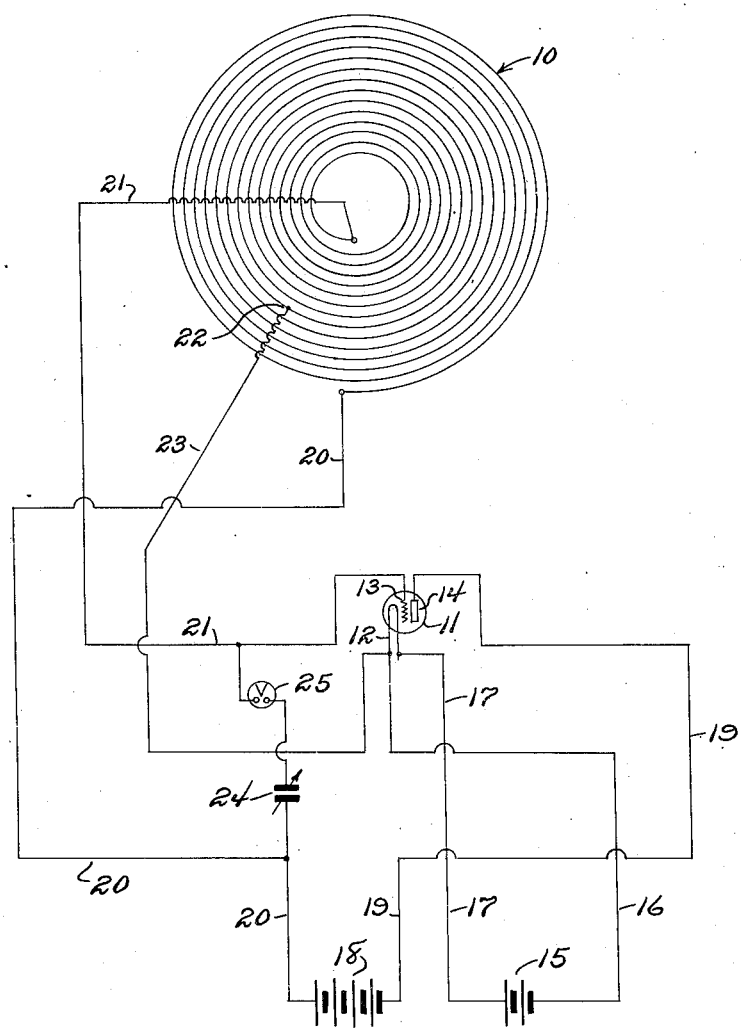
Harry L. Berry
INVENTOR
BY Victor J. Evans & Co.
ATTORNEY
WITNESS:

Patented July 21, 1936

2,048,591

UNITED STATES PATENT OFFICE 2,048,591

METAL DETECTING DEVICE

Harry L. Berry, Tucumcari, N. Mex.

Application July 23, 1934, Serial No. 736,620

2 Claims. (Cl. 175—182)

The invention relates to devices for detecting the presence of metals, ores and the like which are hidden from view, and has for its general object the provision of a novel device which is capable of use upon the surface of the ground, against the walls of cliffs, in shafts, tunnels and the like or even in water for the purpose of ascertaining the presence and definite location of metallic substances, the device being capable of employment not only for prospecting purposes in locating metalliferous ores but also for ascertaining the location of buried pipes and the like, there being no particular restriction as to the character of the objects sought or as to the employment of the device.

It is well known that numerous ore detectors and so-called "treasure finders" and "divining rods" have been devised, some of which are more or less successful. However, with the ordinary type of electro-magnetic device there are numerous objections, one of which is that they are influenced by the presence of moisture which naturally varies the conductivity of the earth being searched. Many previous devices embody head phones in which a sound is produced, the character, such as the pitch, of the sound varying in the event of the presence of metal within the field of search. Any apparatus employing telephone receivers operating in this manner is not accurate as the element of guesswork or human error is involved. Then, again, certain devices are open to the objection that they are influenced by the presence of metallic bodies which are located laterally with respect to the detector or locating device and are therefore inaccurate in determining, definitely, the location.

It is with the above facts in view that I have devised the present invention which has for a very important object the provision of a detector including, fundamentally, an oscillating circuit, an exploring coil constituting an inductance forming part of the circuit, together with an appropriate meter for indicating fluctuations in the frequency of the oscillating circuit resulting from a change in the capacity in the circuit produced by the presence of a metallic body in the electrostatic field about the exploring coil.

Another important object of the invention is to provide a detector of this character in which the construction and arrangement of parts is such that the radiations of the oscillating circuit are directed at substantially only right angles to the plane of the exploring coil so that the device will be affected only by the presence of metallic bodies practically immediately beneath the exploring coil, thereby making it possible to determine accurately the location of hidden metallic bodies.

Another object is to provide a detector of this character which, if the exploring coil is properly insulated, may be used in water as well as on land, and also by means of which hidden metallic masses at considerably greater depths can be located than has hitherto been possible.

A further object is to provide a device of this character which may be easily portable inasmuch as the necessary battery, meter and oscillation producing vacuum tube and its adjuncts may be disposed within a casing from which extend the conductors of any necessary or desirable length connected with the exploring coil.

An additional object is to provide an apparatus of this character which will be very simple and inexpensive to manufacture, easy to make, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

The figure is a diagrammatic view illustrating the invention.

Referring more particularly to the drawing it will be observed that I have shown the entire invention only diagramatically as I consider it unnecessary to disclose the different types or constructions of inductances, or exploring coils, which can be used and as there is no limitation as to the type of meter or other appropriate indicating instrument and likewise no necessity for describing, in detail, the controls for the oscillating circuit producing means and the disposition of the same within a casing, the idea of being to set forth simply the necessary parts or elements which coact to bring about the desired results.

In the drawing it will be observed that I have shown a coil or inductance 10 which is here represented as of the so-called "pan-cake" type though this is not a necessary restriction. This coil may be of any desired diameter and may be formed of any necessary or desirable number of convolutions mounted upon any convenient or preferred support. By referring to the coil as of the pan-cake type, I mean that it may be wound spirally with the convolutions spaced apart and in the same plane though modifications of this construction will naturally suggest themselves.

The second part of the invention consists of means for producing an oscillatory circuit which is preferably of low frequency. This means is here disclosed as comprising a thermionic triode 11 necessarily including a filament 12, a grid 13 and a plate 14. For heating the filaments there is provided a battery 15 of any preferred type which has its terminals connected by conductors 16 and 17 with the respective leads of the filament. There is also provided a higher potential or "B" battery 18 which has one terminal connected by a conductor 19 with the plate 14 of the vacuum tube or triode 11 and which has its other terminal connected by a conductor 20 with the outer end of the coil 10. The innermost end of the coil 10 is connected by a conductor 21 with the grid 13. Taken off the coil 10 at a point 22 which is its exact electrical center is a conductor 23 which connects with the lead 16 to the filament 12. Shunted across the conductors 20 and 21 is a condenser 24 of either the fixed or variable type, though the latter is shown, which is in series with a meter or indicator 25 which may be an A. C. meter, a direct current voltage indicator, having rectifying means associated therewith, or any other equivalent measuring device that will indicate a change of voltage or current. No details as to the type of indicator are given as it is considered that various kinds might be suitable for the purpose.

As stated in the objects of the invention, the vacuum tube or thermionic triode, with its adjuncts, together with the meter 25, condenser 24 and batteries 15 and 18 may be enclosed within an easily portable case. The conductors 20, 21 and 23 are of indeterminate length depending upon the character of the exploring to be done.

In the use of the device, the circuit including the batteries, the tube and the condenser is set into oscillation in the usual and well known manner, no detailed description being necessary, and the coil 10 is moved about over the surface of the ground, or beneath the water, where it is desired to ascertain whether or not there are any buried or hidden metals. Whenever such are approached it is clear that they will exert a capacitive effect upon the electro-static field surrounding or projected from the coil or inductance 10. Such change in capacity caused by the presence of metallic objects will affect the electro-static field and consequently the oscillatory circuit and cause fluctuations in the latter which will be reflected or disclosed by a direct reading on the meter or indicator 25. By moving the coil 10 about from place to place the extent of a hidden metalliferous deposit may be plotted or the direction of extent of a buried pipe or the like may be readily ascertained.

A distinct feature of advantage is that in the use of my invention the exploring coil 10 may be suspended over the face of a cliff or against the walls of a shaft or the like or even may be entirely submerged in water. Moreover it makes no difference whether the surface or underlying strata of the earth are wet or dry as the device will function equally well in either instance. In addition to this, the presence of very small metallic objects such as tacks, nails or the like will be negligible. Moreover, it is a known fact that the radiation from such a coil as I disclose will emanate therefrom at substantially right angles to the plane thereof, thereby avoiding susceptibility of the detector to the presence of laterally disposed metallic masses. In other words the sensitiveness or responsiveness of the coil through which the oscillations are constantly passing will be dependent upon the presence of metallic bodies substantially immediately beneath the coil instead of off to the side. This makes the device far more accurate than the well known types and enables the operator to determine with a good degree of accuracy the exact location of the masses or objects sought or explored for.

From the foregoing description and a study of the drawing it will be seen that I have thus provided an extremely simple, inexpensive and easily handled device for the purpose specified. Moreover it is thought that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims, hereunto appended.

Having thus described the invention, I claim:

1. An apparatus for detecting the presence of and locating metallic bodies hidden beneath the surface of the ground or water, comprising an exploring coil constituting an inductance and movable about the surface in parallel relation thereto, and means for producing an oscillating current flowing through said coil comprising a vacuum tube having filament, grid and plate elements, a battery for heating said filament, a relatively high potential battery having one terminal connected with said plate element and its other terminal connected with the outer end of said coil, the inner end of said coil being connected with said grid element, a connection between one filament lead and the electrical center of the coil, and means shunted across the grid and second named terminal of said high potential battery for indicating fluctuations in the oscillatory current produced by the capacitive effect resulting from the presence of metallic bodies in the electro-static field adjacent the coil.

2. An apparatus for detecting the presence of and locating metallic bodies hidden beneath the surface of the ground or water, comprising an exploring coil constituting an inductance and movable about the surface in parallel relation thereto, and means for producing an oscillating current flowing through said coil comprising a vacuum tube having filament, grid and plate elements, a battery for heating said filament, a relatively high potential battery having one terminal connected with said plate element and its other terminal connected with the outer end of said coil, the inner end of said coil being connected with said grid element, a connection between one filament lead and the electrical center of the coil, and, shunted across the grid and the second named high potential battery, a condenser and indicator in series, said indicator being operable to disclose fluctuations in the oscillatory circuit resulting from the capacitive influence of metallic bodies in the electro-static field adjacent the coil.

HARRY L. BERRY.